(12) United States Patent
Liao et al.

(10) Patent No.: US 8,447,117 B2
(45) Date of Patent: May 21, 2013

(54) BLOCK-EDGE DETECTING METHOD AND ASSOCIATED DEVICE

(75) Inventors: Cheng-Yu Liao, Hsinchu Hsien (TW); Ren-Kuan Liang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 252 days.

(21) Appl. No.: 12/957,691

(22) Filed: Dec. 1, 2010

(65) Prior Publication Data

US 2011/0129156 A1    Jun. 2, 2011

(30) Foreign Application Priority Data

Dec. 1, 2009 (TW) ................................ 98141047 A

(51) Int. Cl.
*G06K 9/48* (2006.01)
(52) U.S. Cl.
USPC ......................................................... 382/199

(58) Field of Classification Search
USPC .................................................. 382/199, 268
See application file for complete search history.

(56) References Cited

U.S. PATENT DOCUMENTS

2010/0226573 A1 *   9/2010   Lertrattanapanich et al. ............................ 382/168

FOREIGN PATENT DOCUMENTS

JP          2008124901 A   *   5/2008

* cited by examiner

*Primary Examiner* — Samir Ahmed
*Assistant Examiner* — Totam Le
(74) *Attorney, Agent, or Firm* — WPAT, PC; Justin King

(57) ABSTRACT

A block-edge detecting method, for processing an image including a plurality of pixels, includes performing a difference calculation on the plurality of pixels of the image; generating statistic data according to a difference calculation result with an accumulation approach; determining a block width according to the statistic data; and obtaining a plurality of block-edge positions corresponding to the image according to the block width.

17 Claims, 6 Drawing Sheets

BLOCK-EDGE DETECTING METHOD AND ASSOCIATED DEVICE

CROSS REFERENCE TO RELATED PATENT APPLICATION

This patent application is based on Taiwan, R.O.C. patent application No. 098141047 filed on Dec. 1, 2009.

FIELD OF THE INVENTION

The present invention relates to an image processing method an associated device, and more particularly, to a method for detecting block edges of an image.

BACKGROUND OF THE INVENTION

As current applications associated with a multimedia image rapidly develops, various operating techniques, e.g., image compression, image encoding, image encryption and image matching, become mature to meet with user requirements of a large amount of image transmission, image conservation and image broadcasting.

Most video encoding techniques are based on the Joint Photographic Experts Groups (JPEG) standard, which is one of most common static image compression standards. Generally, the JPEG standard is a block-based static image processing technique for dividing an image into a plurality of non-overlapping blocks, each of which is to be converted and encoded. The block-based image compression technique is widely applied to multimedia video encoding processing. An operating principle of a dynamic image processing technique, e.g., the Moving Picture Exerts Group (MPEG) standard applied to image compression, also implements the image processing technique similar to the block-based JPEG standard.

Current image compression methods with the block-based MPEG standard are frequently applied to various types of network video transmission, digital televisions (TV) or video discs. However, when errors occur in decompressing or decoding a dynamic image or a static image that is stored or transmitted after being processed with the block-based video compression technique, image distortion may be created.

For example, when a user wishes to play a video disc via a multimedia player (e.g., a DVD player), a decoder of the DVD player inversely decompresses compressed videos from the video disc based on blocks, and the decompressed blocks are arranged to form a complete image frame. However, during the decompression, when distortion occurs in calculation of the decoder of multimedia player, the videos displayed on a screen or a liquid crystal display (LCD) TV may comprise unsmooth edges between blocks of the image frame, such that a frame viewed by an observer may comprise block noises, which is often called "blocking effect".

Generally, the conventional screen or LCD TV passively receives and plays the decompressed image signal generated by the DVD player, without knowing positions of the block edges implemented when the decoder of the DVD player decompresses the image.

In order to reduce the foregoing blocking effect of the image, a current display device mainly adopts a de-blocking filter technique to remove or smooth the block noises. During the process of reducing the blocking effect, when all of the pixels of the image are processed by the de-blocking filter, efficiency of the processing is very low causing frame distortion of other normal areas of the image.

In order to solve the foregoing problem, the present invention provides a block-edge detecting method and an associated device capable of determining in advance block edges of an image to more effectively and more accurately remove block noises.

SUMMARY OF THE INVENTION

An object of the present invention is to provide a block-edge detecting method, which is applied to an image comprising a plurality of pixels.

According to an embodiment of the present invention, the block-edge detecting method comprises performing a difference calculation on the plurality of pixels of the image to generate a difference calculation result; generating statistic data with an accumulation approach according to the difference calculation result; determining a block width according to the statistic data; and obtaining a plurality of block-edge positions of the image according to the block width.

Another object of the present invention is to provide a block-edge detecting device, which is applied to an image comprising a plurality of pixels.

According to another embodiment of the present invention, the block-edge detecting device comprises a difference calculating unit, an accumulating unit, and a determining unit. The difference calculating unit performs a difference calculation on the plurality of pixels of the image to generate a difference calculation result. The accumulating unit generates statistic data according to the difference calculation result. The determining module determines a block width of the image according to the statistic data, and determines a plurality of block-edge positions of the image according to the block width.

Compared to the prior art, a block-edge detecting method and an associated device according to the present invention are capable of determining a block width of an image according to frame content of the image, while further obtaining block-edge positions of the image to perform subsequent processing on block edges that most possibly incur blocking effect noises of the image, increasing image processing efficiency and image processing accuracy while avoiding undesirably affecting other normal areas.

The advantages and spirit related to the present invention can be further understood via the following detailed description and drawings.

DETAILED DESCRIPTION OF THE PREFERRED EMBODIMENT

Figure 1:
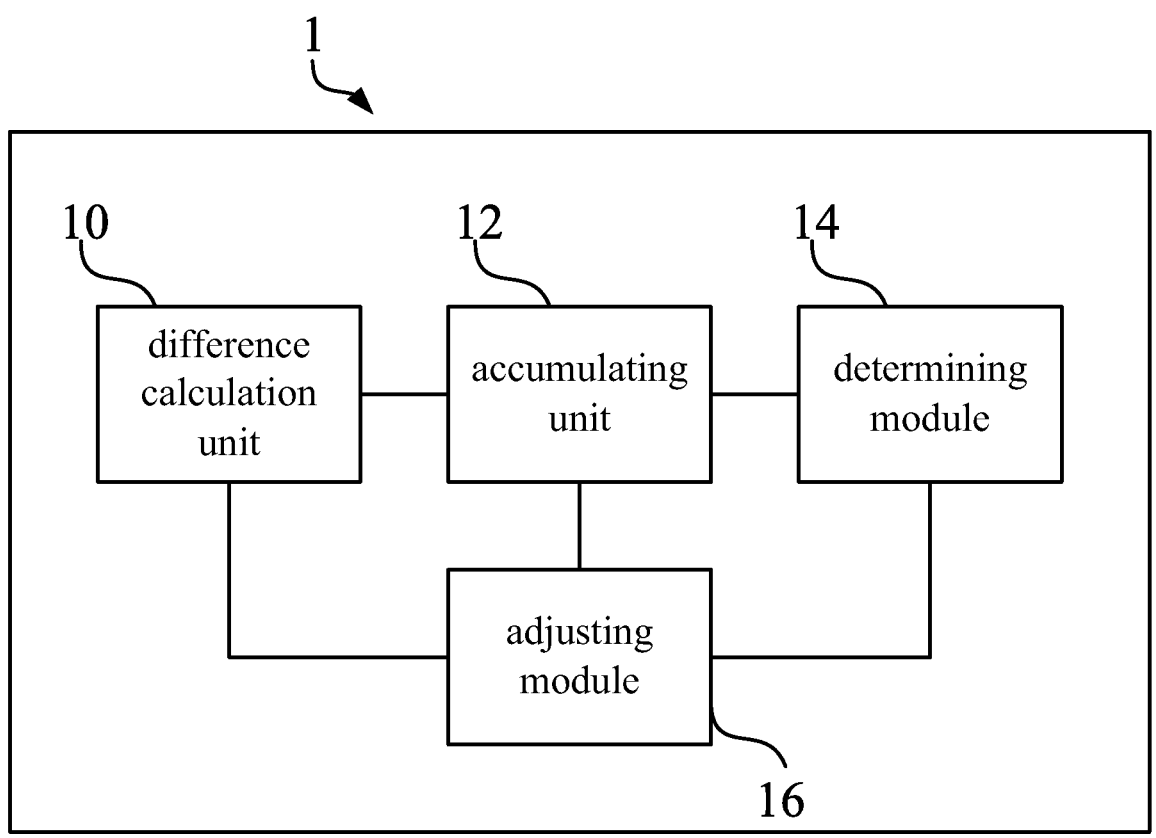
FIG. 1 is a block diagram of a block-edge detecting device in accordance with an embodiment of the present invention.
Figure 2:
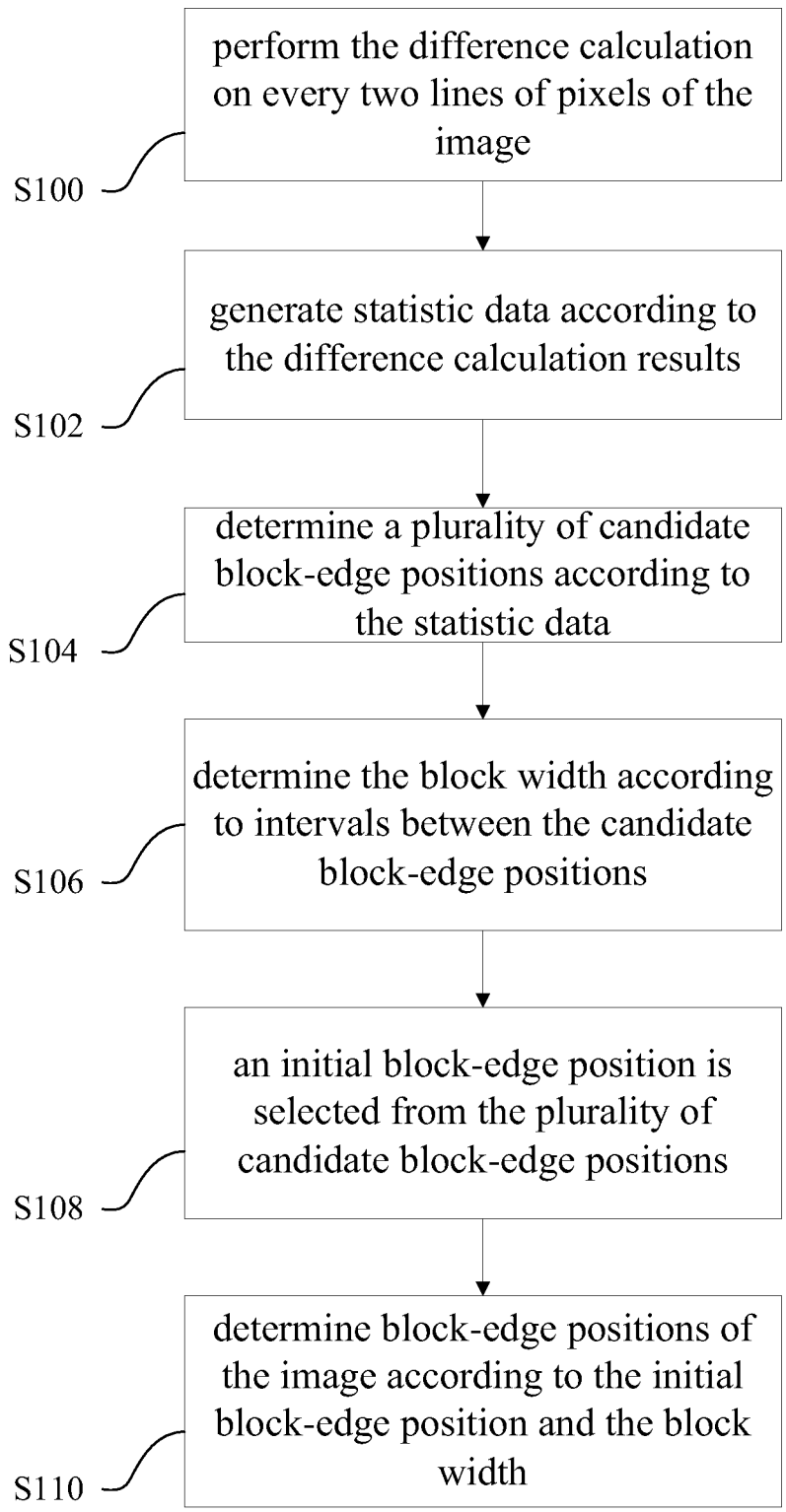
FIG. 2 is a flow chart of a block-edge detecting method in accordance with another embodiment of the present invention.

FIG. 1 shows a block diagram of a block-edge detecting device 1 in accordance with an embodiment of the present invention. FIG. 2 shows a flow chart of a block-edge detecting method in accordance with an embodiment of the present invention. In practical applications, the block-edge detecting device 1 may be a computer system, a multimedia player, an image processing device, or other digital processing device which can be equipped with the block-edge detecting methodology according to the present invention. That is, the block-edge detecting method is not limited to being applied to the foregoing devices, and may be widely applied to various electronic devices.

In this embodiment, the block-edge detecting device 1 comprises a difference calculation unit 10, an accumulating unit 12 and a determining module 14, and can further comprise an adjusting module 16.

Figure 3A:
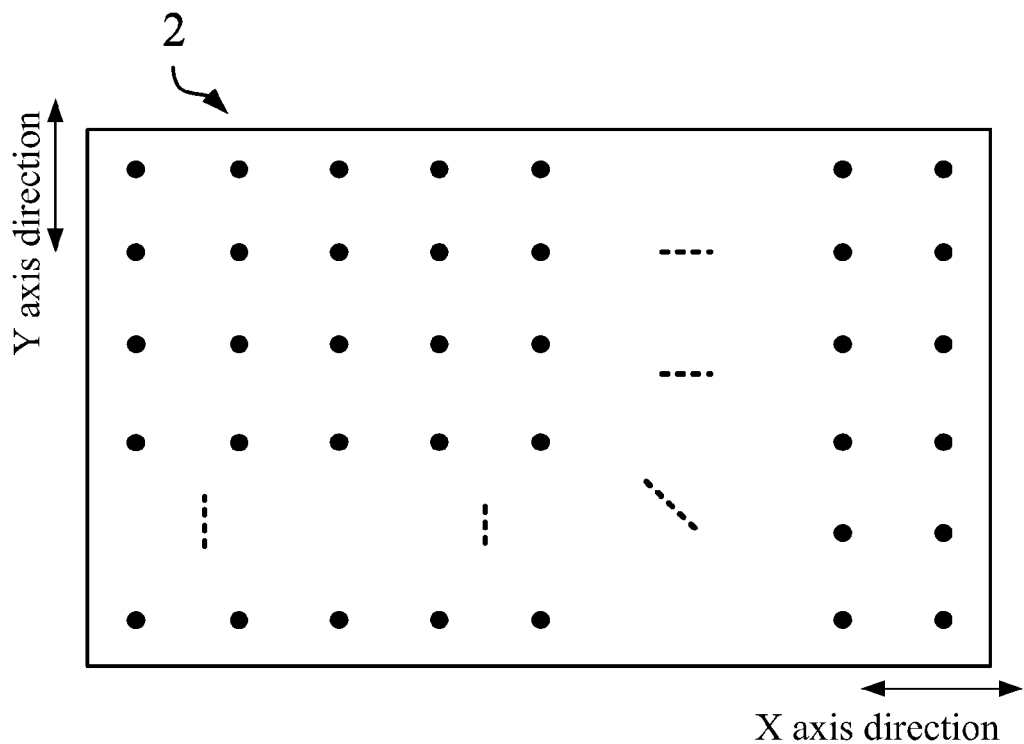
FIG. 3A is a schematic diagram of operations of detecting block edges of an image by the block-edge detecting device in FIG. 1.
Figure 3B:
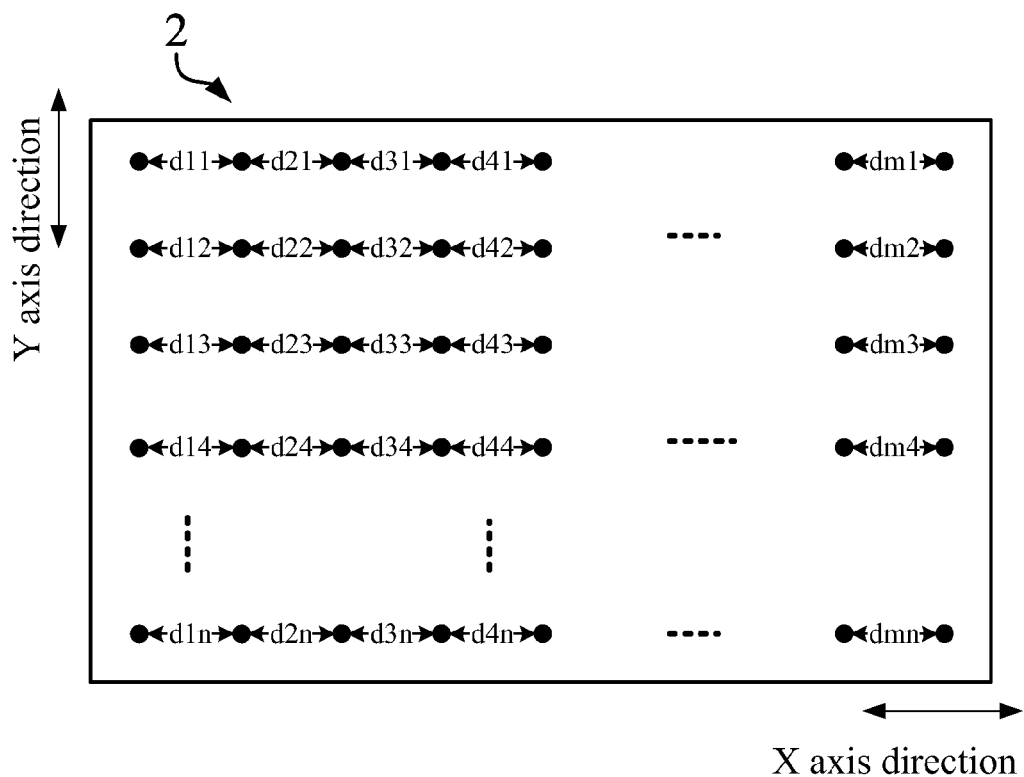
FIG. 3B is a schematic diagram which includes difference calculation results derived during operations for detecting block edges of an image by the block-edge detecting device in FIG. 1.

Following description is given with reference to FIG. 3A to FIG. 3D, which are schematic diagrams of operations of detecting block edges of an image 2 by the block-edge detecting device 1. Referring to FIG. 3A, the image comprises a plurality of pixels. FIG. 3A shows a picture of the image 2, for example, shown on a screen. Generally, certain pixels corresponding to the picture of the screen are tightly adjacent to each other, and each of the pixels in FIG. 3A is represented by a block solid cycle having an interval therebetween for illustration purposes.

Referring now to FIG. 2, the block-edge detecting method begins with Step S100 in which a difference calculation is performed on the plurality of pixels of the image 2 by the difference calculation unit 10 shown in FIG. 1. Corresponding to the designations shown in FIG. 3B, Step S100 is to perform the difference calculation on every two lines of pixels of the image 2. For example, the difference calculation is performed on a first line and a second line in an X axis direction, one difference (e.g., d11) is generated according to every two adjacent pixels, and thus n differences (e.g., d11 to d1$n$) are generated according to every pair of pixels in the first line and the second line. In this embodiment, the difference calculation may be, but not limited to, obtaining a difference between luminance values, chrominance values or grayscale values of two adjacent pixels. The difference calculation results are designated d11 to d1$n$ and dm1 to dm$n$ in FIG. 3B, for example, where m and n are natural numbers corresponding to a resolution (e.g., 800×600) of the image 2.

Figure 3C:
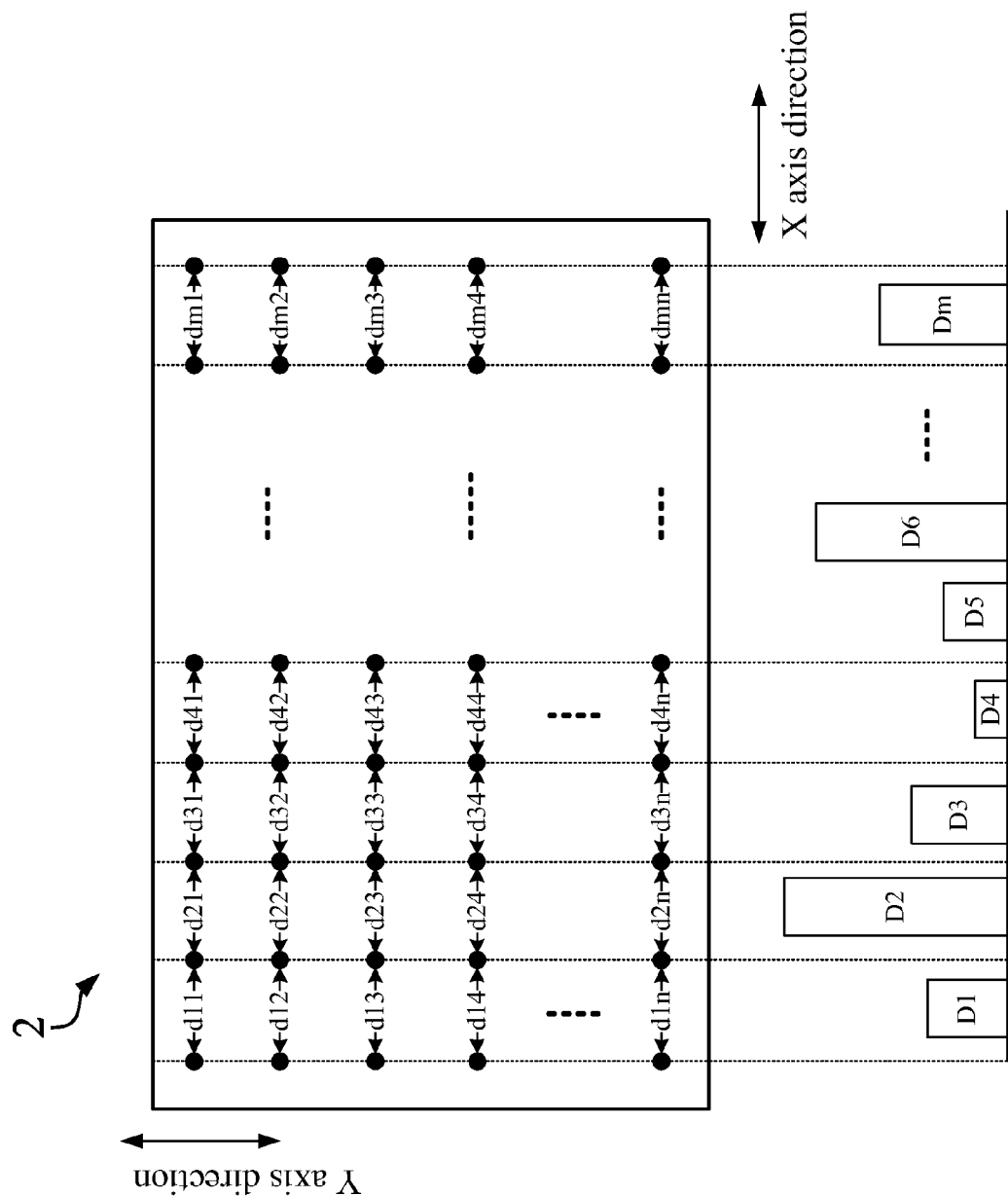
FIG. 3C is a schematic diagram which includes accumulated difference calculation results derived during operations for detecting block edges of an image by the block-edge detecting device in FIG. 1.
Figure 3D:
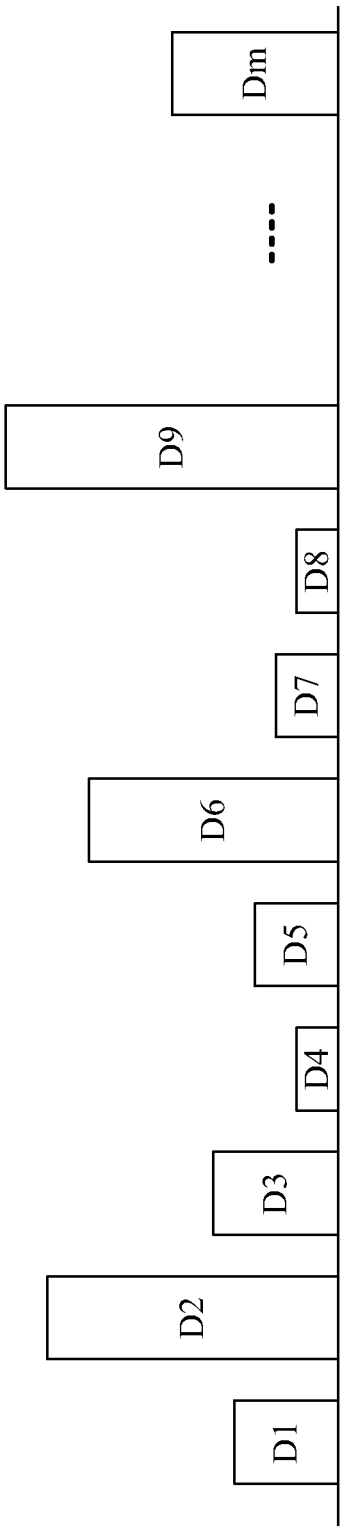
FIG. 3D is a schematic diagram of accumulated difference calculation results derived during operations for detecting block edges of an image by the block-edge detecting device in FIG. 1.

The method proceeds to Step S102 in which statistic data is generated according to the difference calculation results d11 to dm$n$ by the accumulating unit 12. Referring to FIG. 3C and FIG. 3D, in Step S102, the accumulating unit 12 accumulates difference calculation results in a same line, e.g., d11 to d1$n$, to generate an accumulation result D1, and accumulates difference calculation results d21 to d2$n$ to generate an accumulation result D2, and so forth. Accumulation results are generated for each line in the image. Accordingly, accumulation results D1 to Dm are respectively generated as shown in FIG. 3C. The accumulation results D1 to Dm are arranged in the x axis direction to form the statistic data corresponding to the image 2 in this embodiment, as shown in FIG. 3D.

It is to be noted that, in the foregoing embodiment, the difference calculation is first performed on every two adjacent lines in a horizontal direction in Step S100, and difference calculation results in a same line are then accumulated in a vertical direction in Step S102, so as to form the statistic data arranged in the x axis direction; however, these processing directions are not limitations of the present invention. Likewise, in another embodiment, the difference calculation is first performed on every two adjacent columns of pixels in the vertical direction Step S100, and difference calculation results in the same row are then accumulated in the horizontal direction in Step S102, so as to form statistic data arranged in a Y axis direction. In this instance, only the calculation direction is correspondingly changed, and detailed description of the modifications are approximately identical to the foregoing embodiment and shall not be described for brevity.

The block-edge detecting method proceeds to Step S104 and Step S106 in which a block width of the image 2 is determined according to the statistic data by the determining module 14. In Step S104, the determining module 14 selects a plurality of accumulation results greater than a threshold value, e.g., three groups of accumulation results D2, D6 and D9 corresponding to three candidate block-edge positions. In practical applications, numerous candidate block-edge positions are determined in a single image, and in this embodiment, three candidate block-edge positions are taken as example for illustrative purposes.

In Step S106, the determining module 14 determines the block width according to intervals between the candidate block-edge positions, being described in greater detail below.

In Sub-step 1, an interval between every two candidate block-edge positions is calculated to generate a candidate block width, e.g., a candidate block width of 4 is generated according to D2 and D6, and a candidate block width of 3 is generate according to D6 and D9, and so on.

In Sub-step 2, the number of accumulation times of the candidate block widths is counted according to the calculated plurality of candidate block widths.

In Sub-step 3, a candidate block width having a largest number of accumulation times is selected as the block width from the plurality of candidate block widths according to the number of accumulation times of the candidate block widths. For instance, supposing that the candidate block width of 4 has a largest number of accumulation times as high as 15 times, and the candidate block width of 3 has a second-largest number of accumulation times as high as 10 times. Accordingly, in this instance, the block width is determined as 4.

In addition, the approach for determining the block width is not limited to the foregoing description. In another embodiment, in Sub-step 3, a candidate block width having a largest number of accumulation times is selected as a first candidate block width, and a candidate block width having a second-largest number of accumulation times is selected as a second candidate block width. The determining module 14 calculates a weighted interval width according to the first candidate block width and the second candidate block width and corresponding accumulation times. For instance, suppose that a candidate block width of 4 has a largest number of accumulation times as high as 15 times, and a candidate block width of 3 has a second-largest number of accumulation times as high as 10 times. Accordingly, in this instance, the block width is calculated as:

$$\frac{(4 \times 15 + 3 \times 10)}{15 + 10} = 3.6$$

The block-edge detecting method proceeds to Step S108 and Step S110 in which a plurality of block-edge positions of the image is obtained according to the block width by the determining module 14. For images of different sizes and different image processing methods, the blocks of the image 2 are not average distributed from an initial point. In practical applications, edges of the images may be not aligned with block edges. Therefore, in Step S108, an initial block-edge position is selected from the plurality of candidate block-edge positions (e.g., the candidate block-edge positions comprising D2, D6 and D9 in FIG. 3D) of the statistic data (e.g., as shown in FIG. 3D). In this embodiment, it is determined that the candidate block-edge position D2 (corresponding to the difference between pixels of the second line and a third line) serves as the initial block-edge position.

It is to be noted that, in Step S108 of determining the initial block-edge position according to the plurality of candidate block-edge positions, when it is determined that more than two adjacent candidate block-edge positions may be selected, the initial block-edge position is further determined according to the block width. For example, when the candidate block-edge positions having larger accumulation results comprise D2, D3, D7, D11, D15, . . . , and the like, which are arranged in sequence from the left side to the right side, since both of D2 and D3 may be the initial block-edge position, D3 is determined as the initial block-edge position with reference to an arrangement relationship among D7, D11 and D15 as well as the block width of 4.

In Step S110, block-edge positions of the image 2 are determined according to the initial block-edge position D2 and the block width calculated in Step S104 to Step S106. In this embodiment, when the block width determined in Step S106 is 4, the block-edge positions correspond to D2, D6, D10, . . . , D2+4i, where i is a natural number and 2+4i is smaller than m.

In addition, when the block width in Step S106 has a fractional part or a mixed fraction, e.g., the block width is 3.6, the positions having the interval of 3 (having a ratio of 40%) and positions having the interval of 4 (having a ratio of 60%) are alternately determined as the block-edge positions.

After the block-edge positions of the image 2 are obtained by the block-edge detecting method according to the present invention and the block-edge detecting device 1, subsequent processing is performed on block edges most possibly incurring blocking effect noises of the image 2. In the prior art, a blocking filter is directly applied to process the overall image 2; such full-field image processing takes longer time and requires more system calculation resources. Compared to the prior art, the device and method according to the present invention detects block edges in advance to increase image processing efficiency and image processing accuracy while avoiding undesirably affecting other normal areas.

Figure 4:
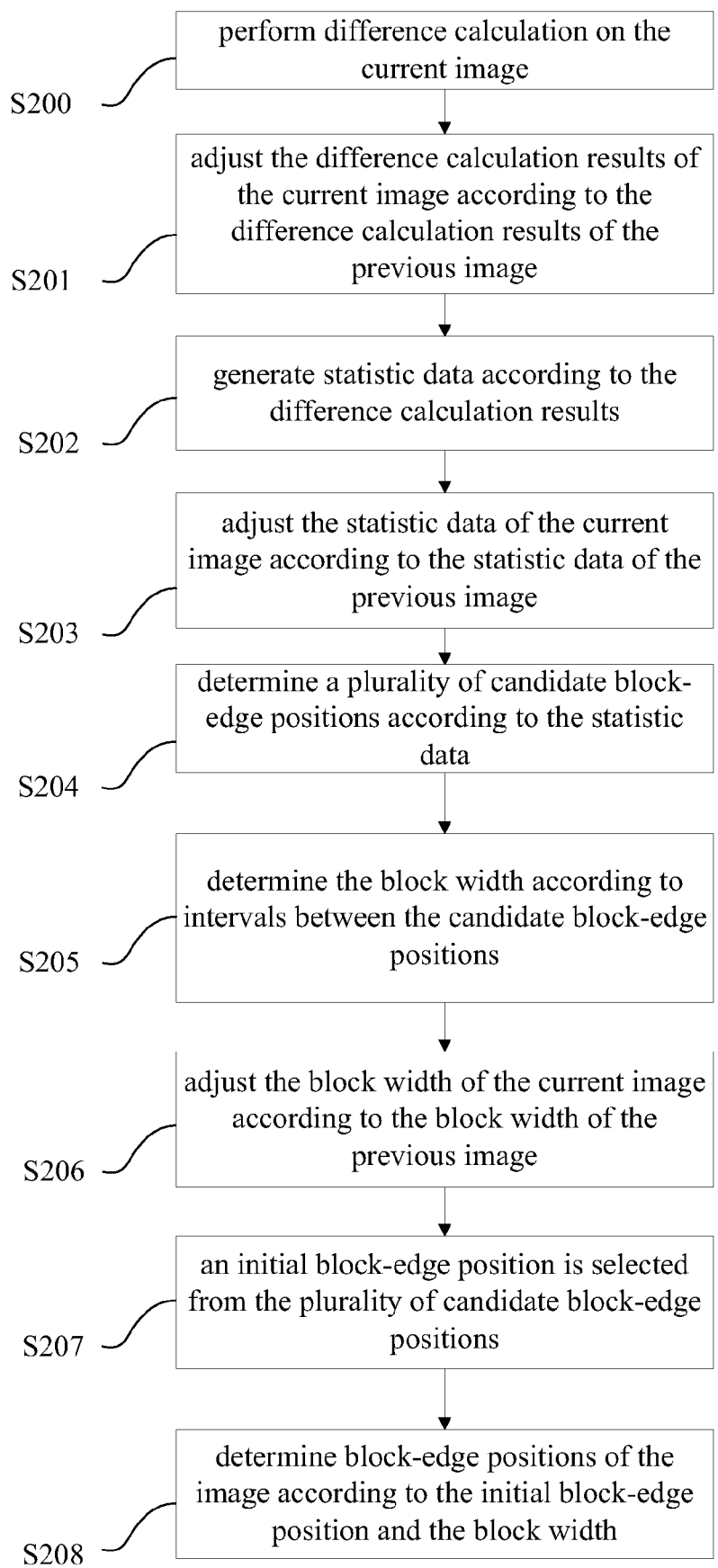
FIG. 4 is a flow chart of a block-edge detecting method comprising timing weight adjusting steps.

In addition, in this embodiment, the image 2 processed by the block-edge detecting device 1 according to the present invention is a current image of a consecutive image stream. The adjusting module 16 of the block-edge detecting device 1 is stored with difference calculation results of a plurality of previous images of the image stream for timing weight adjustment with respect to the foregoing processing. Refer to FIG. 4 showing a flow chart of a block-edge detecting method further comprising timing weight adjusting steps. The main difference between the embodiment in FIG. 4 and the foregoing embodiments is that, the block-edge detecting method shown in FIG. 4 further comprises timing weight adjusting steps S201, S203 and S206.

For example, the adjusting module 16 can be stored with a group of previous difference calculation results, which correspond to at least one previous image of the image stream. After Step S200 of performing difference calculation on the current image is completed, the adjusting module 16 proceeds to Step S201 in which the previous difference calculation results are multiplied with a timing weight, and the multiplied previous difference calculation results and difference calculation results of the current image are used for performing a weight calculation. The adjusting module 16 then adjusts the difference calculation results of the current image according to the result of the weight calculation.

Likewise, the adjusting module 16 can store a group of previous statistic data (i.e., Step S203) or a group of previous block widths (i.e., Step S206), which are respectively used for performing weight calculation with statistic data or a block width of the current image. The adjusting module 16 then accordingly adjusts the statistic data or the block width of the current image, and details thereof shall not be described for brevity. Accordingly, the adjusting module 16 can eliminate dramatic variations of the determination process and results of the foregoing block edges at time points within a time interval (e.g., the determination results of the block width are suddenly enlarged to several multiples, and thus avoiding error determinations of subsequent calculation due to the dramatic variations.

Compared to the prior art, a block-edge detecting method and an associated device according to the present invention are capable of dynamically determining a block width of an image according to frame content of the image, and further obtaining block-edge positions of the image. Accordingly, subsequent processing can be performed on block edges of the image to avoid undesirably affecting other normal areas. The block-edge detecting method and the associated device according to the present invention may further adopt a timing weight adjusting mechanism to eliminate error determinations caused by over-large variations of determination process and results of block edges at time points within a time interval.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A block-edge detecting method, applied to an image comprising a plurality of pixels, the method comprising:
   (a) performing a difference calculation on the plurality of pixels of the image to generate a difference calculation result, comprising:
      obtaining a previous difference calculation result corresponding to at least one previous image of the image stream; and
      adjusting the difference calculation result of the current image according to the previous difference calculation result;
      wherein the image is a current image of an image stream;
   (b) generating statistic data according to the difference calculation result with an accumulation approach;
   (c) determining a block width according to the statistic data; and
   (d) obtaining a plurality of block-edge positions of the image according to the block width.

2. The method as claimed in claim 1, wherein performing a difference calculation on the plurality of pixels of the image is done by
   performing difference calculations on the plurality of pixels of every two adjacent lines of said image; and generating the statistic data according to the difference calculation result is generated from performing difference calculations on every two adjacent lines of the plurality of pixels of the image.

3. The method as claimed in claim 1, wherein determining a block width comprises:
   (c1) generating a plurality of candidate block-edge positions according to the statistic data; and
   (c2) determining the block width according to an interval relationship among the plurality of candidate block-edge positions.

4. The method as claimed in claim 3, wherein obtaining a plurality of block-edge positions of the image comprises:
   selecting an initial block-edge position from the plurality of candidate block-edge positions according to the block width.

5. The method as claimed in claim 4, wherein obtaining a plurality of block-edge positions of the image further comprises:
   generating the plurality of block-edge positions of the image according to the initial block-edge position and the block width.

6. The method as claimed in claim 3, wherein determining the block width comprises:
   generating a candidate block width according to every two candidate block-edge positions of the plurality of candidate block-edge positions;
   counting the number of accumulation times of each of the candidate block width according to the calculated plurality of candidate block widths; and
   selecting one candidate block width as the block width from the plurality of candidate block widths according to the number of the accumulation times of each of the candidate block widths.

7. The method as claimed in claim 1, wherein the image is a current image of an image stream, and determining a block width comprises:
   obtaining a previous block width corresponding to at least one previous image of the image stream; and
   adjusting the block width of the current image according to the previous block width.

8. A block-edge detecting device, applied to an image comprising a plurality of pixels, the device comprising:
   a difference calculating unit, for performing a difference calculation on the plurality of pixels of the image to generate a difference calculation result;
   an accumulating unit, for accumulating statistic data according to the difference calculation result; and
   a determining module, for determining a block width of the image according to the statistic data, and obtaining a plurality of block-edge positions of the image according to the block width, wherein the determining module generates a plurality of candidate block-edge positions according to the statistic data, determines the block width according to an interval relationship among the plurality of candidate block-edge positions, respectively generates a candidate block width with respect to every two candidate block-edge positions of the plurality of the candidate block-edge positions, counting the number of accumulation times of each of the candidate block widths, and selects one candidate block width from the candidate block widths according to the number of accumulation times of each of the candidate block widths.

9. The block-edge detecting device as claimed in claim 8, wherein the difference calculating unit performs the difference calculation on every two adjacent lines of the plurality of pixels, and the accumulating unit generates the statistic data according to the difference calculation result generated by performing the difference calculation on every two adjacent lines of the plurality of pixels.

10. The block-edge detecting device as claimed in claim 8, wherein the determining module selects an initial block-edge position according to the block width.

11. The block-edge detecting device as claimed in claim 10, wherein the determining module generates the plurality of block-edge positions according to the initial block-edge position and the block width.

12. The block-edge detecting device as claimed in claim 8, further comprising an adjusting module, with the image processed by the block-edge detecting device being a current image of an image stream, the adjusting module being stored with a previous difference calculation result corresponding to at least one previous image of the image stream, for adjusting the difference calculation result of the current image according to the previous difference calculation result.

13. The block-edge detecting device as claimed in claim 8, further comprising an adjusting module, with the image processed by the block-edge detecting device being a current image of an image stream, the adjusting module being stored with previous statistic data corresponding to at least one previous image of the image stream, for adjusting the statistic data of the current image according to the previous statistic data.

14. The block-edge detecting device as claimed in claim 8, further comprising an adjusting module, with the image processed by the block-edge detecting device being a current image of an image stream, the adjusting module being stored with a previous block width corresponding to at least one previous image of the image stream, for adjusting the block width of the current image according to the previous block width.

15. A block-edge detecting method, applied to an image comprising a plurality of pixels, the method comprising:
   (a) performing a difference calculation on the plurality of pixels of the image to generate a difference calculation result;
   (b) generating statistic data according to the difference calculation result with an accumulation approach;
   (c) determining a block width according to the statistic data, comprising:
      (c1) generating a plurality of candidate block-edge positions according to the statistic data; and
      (c2) determining the block width according to an interval relationship among the plurality of candidate block-edge positions;
      (c3) generating a candidate block width according to every two candidate block-edge positions of the plurality of candidate block-edge positions;
      (c4) counting the number of accumulation times of each of the candidate block widths according to the calculated plurality of candidate block widths;
      (c5) selecting a first candidate block width and a second candidate block width from the plurality of candidate block widths according to the number of accumulation times of each of the candidate block widths; and
      (c6) calculating a weighted block width as the block width according to sizes of the first candidate block width the second candidate block width and the corresponding accumulation times; and
   (d) obtaining a plurality of block-edge positions of the image according to the block width.

16. A block-edge detecting method, applied to an image comprising a plurality of pixels, the method comprising:

(a) performing a difference calculation on the plurality of pixels of the image to generate a difference calculation result;
(b) generating statistic data according to the difference calculation result with an accumulation approach, comprising:
  obtaining previous statistic data corresponding to at least one previous image of the image stream; and
  adjusting the statistic data of the current image according to the previous statistic data;
  wherein the image is a current image of an image stream;
(c) determining a block width according to the statistic data; and
(d) obtaining a plurality of block-edge positions of the image according to the block width.

17. A block-edge detecting device, applied to an image comprising a plurality of pixels, the device comprising:
  a difference calculating unit, for performing a difference calculation on the plurality of pixels of the image to generate a difference calculation result;
  an accumulating unit, for accumulating statistic data according to the difference calculation result; and
  a determining module, for determining a block width of the image according to the statistic data, and obtaining a plurality of block-edge positions of the image according to the block width, wherein the determining module generates a plurality of candidate block-edge positions according to the statistic data, and determines the block width according to an interval relationship among the plurality of candidate block-edge positions, respectively generates a candidate block width with respect to every two candidate block-edge positions of the plurality of candidate block-edge positions, counts the number of accumulation times of each of the candidate block widths according to the calculated plurality of candidate block widths, selects a first candidate block width and a second candidate block width from the plurality of candidate block widths according to the number of accumulation times of each of the candidate block widths, and calculates a weighted block width as the block width according to sizes of the first candidate block width and the second candidate block width and corresponding accumulation times.

* * * * *